APPARATUS FOR PROCESSING HEAT-SOFTENABLE MATERIALS

Original Filed April 18, 1956

INVENTORS
GAMES SLAYTER
HENRY J. SNOW
ROBERT G. RUSSELL
DALE KLEIST
BY
Staelin & Overman
ATTYS.

APPARATUS FOR PROCESSING HEAT-SOFTENABLE MATERIALS

Original Filed April 18, 1956 7 Sheets-Sheet 2

INVENTORS
GAMES SLAYTER
HENRY J. SNOW
ROBERT G. RUSSELL
DALE KLEIST
BY
Staelin & Overman
ATTYS.

APPARATUS FOR PROCESSING HEAT-SOFTENABLE MATERIALS

Original Filed April 18, 1956 7 Sheets-Sheet 3

INVENTORS
GAMES SLAYTER
HENRY J. SNOW
ROBERT G. RUSSELL
DALE KLEIST
BY
Staelin & Overman
ATTYS.

APPARATUS FOR PROCESSING HEAT-SOFTENABLE MATERIALS
Original Filed April 18, 1956 7 Sheets-Sheet 4
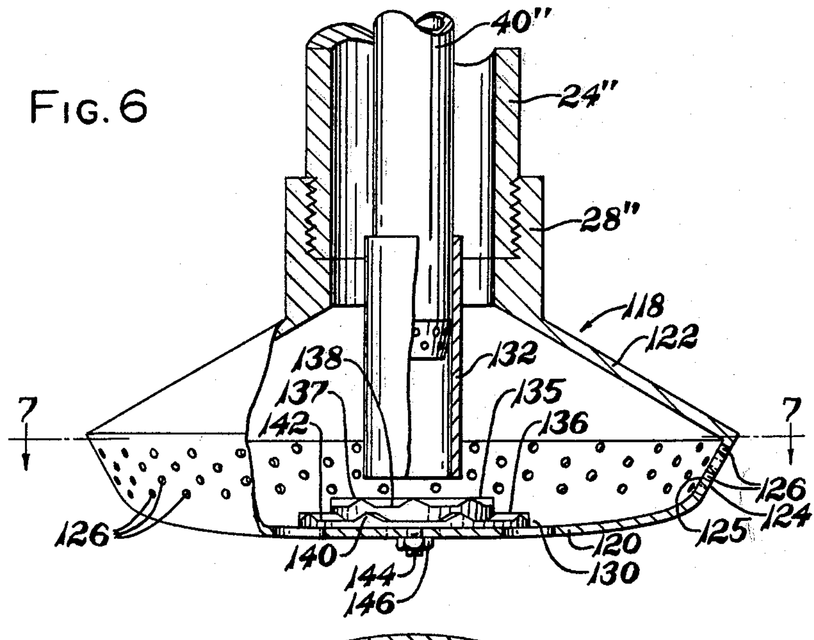
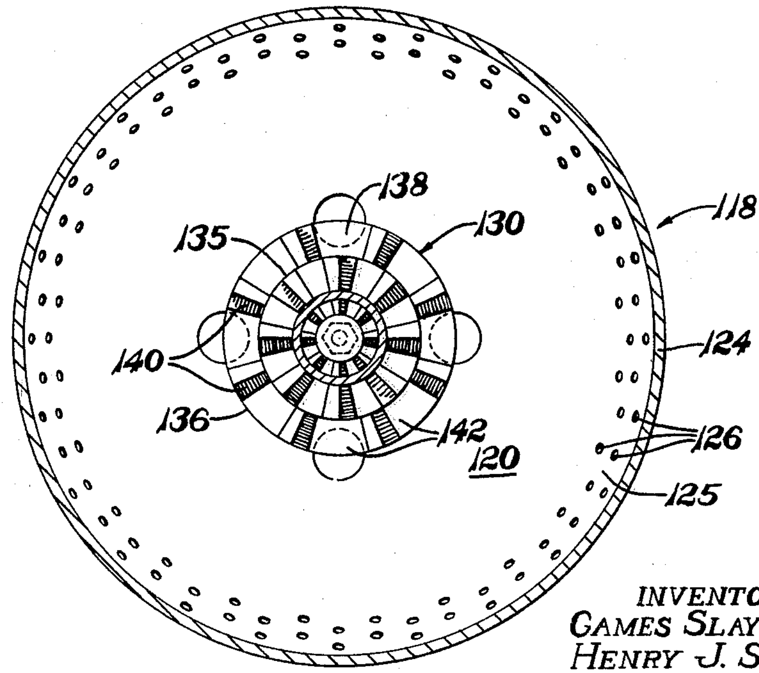
FIG. 7
INVENTORS
GAMES SLAYTER
HENRY J. SNOW
ROBERT G. RUSSELL
DALE KLEIST
BY
Staelin & Overman
ATTYS.

APPARATUS FOR PROCESSING HEAT-SOFTENABLE MATERIALS

INVENTORS
GAMES SLAYTER
HENRY J. SNOW
ROBERT G. RUSSELL
DALE KLEIST
BY Stachin & Anderson
ATTYS.

APPARATUS FOR PROCESSING HEAT-SOFTENABLE MATERIALS
Original Filed April 18, 1956
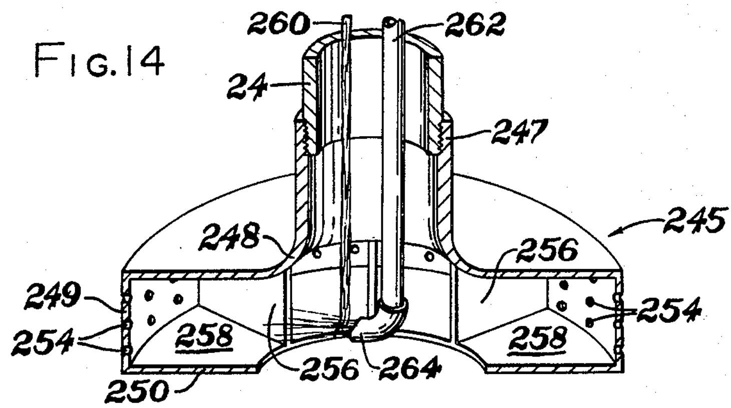
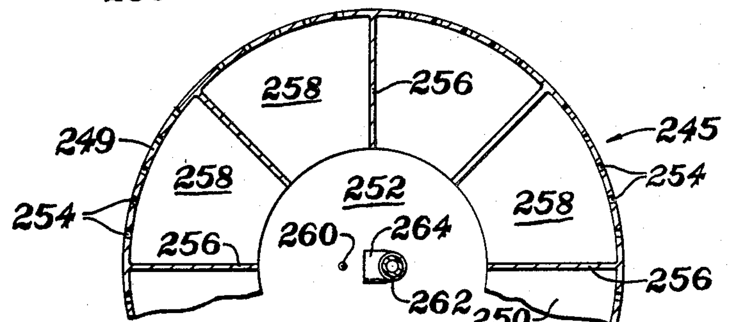
FIG.15
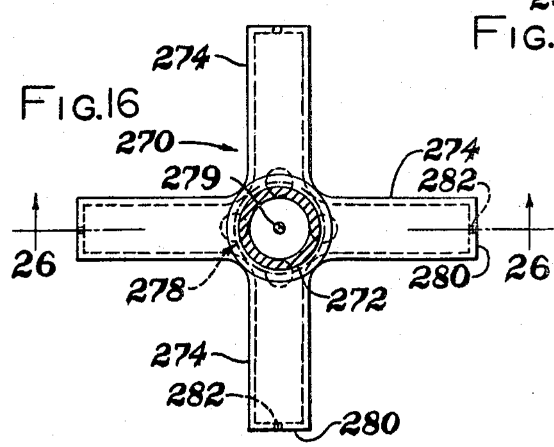
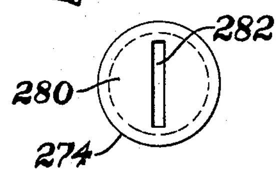
FIG.18
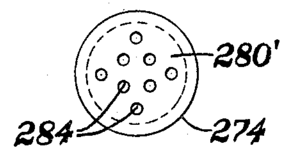
FIG.19
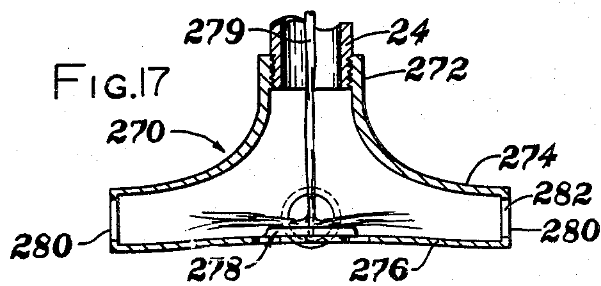
INVENTORS
GAMES SLAYTER
HENRY J. SNOW
ROBERT G. RUSSELL
DALE KLEIST
BY Staelin & Overman
ATTYS.

APPARATUS FOR PROCESSING HEAT-SOFTENABLE MATERIALS
Original Filed April 18, 1956 
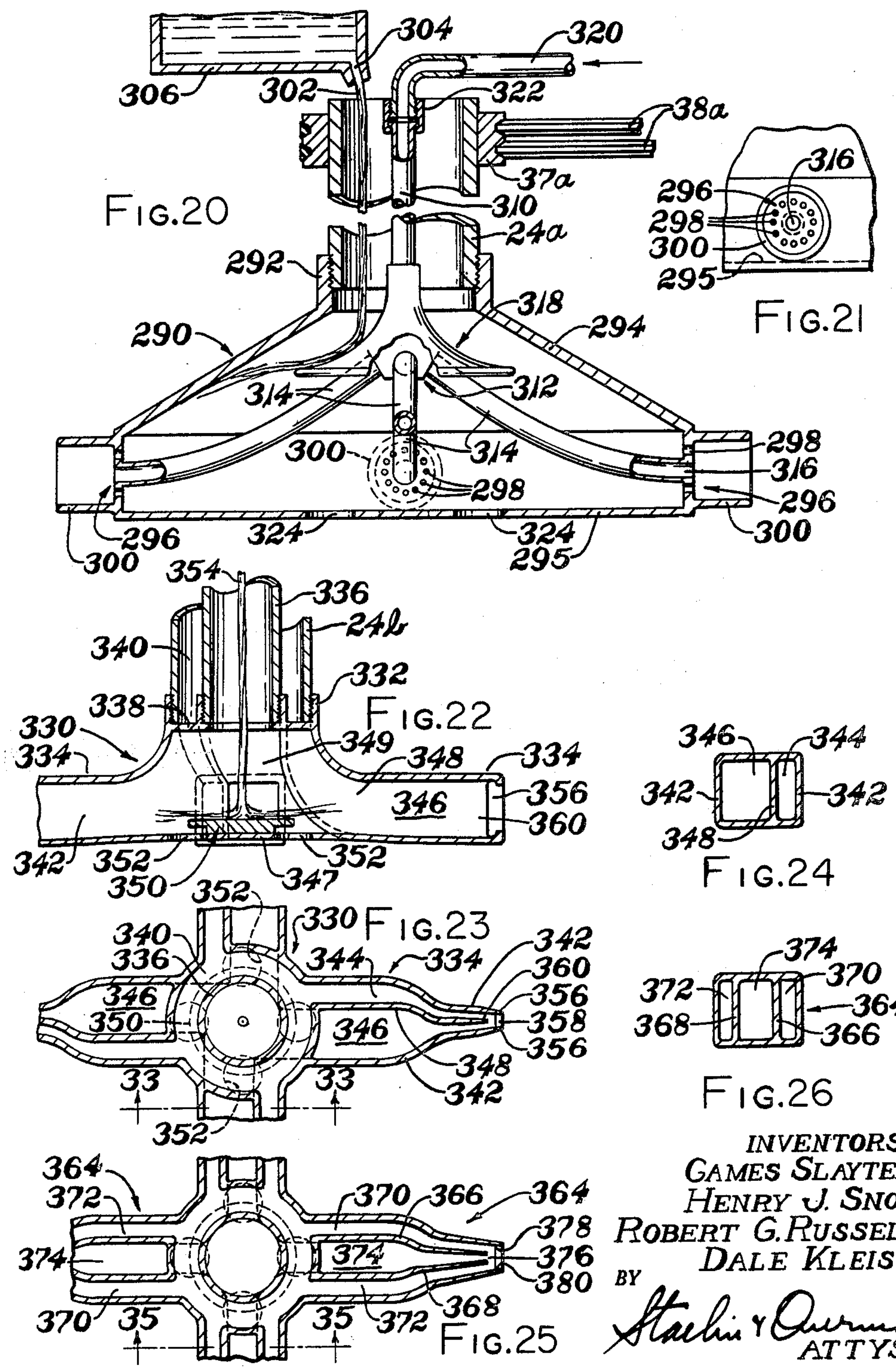
INVENTORS
GAMES SLAYTER
HENRY J. SNOW
ROBERT G. RUSSELL
DALE KLEIST
BY
Staelin & Overman
ATTYS.

United States Patent Office
3,177,058
Patented Apr. 6, 1965

3,177,058

APPARATUS FOR PROCESSING HEAT-SOFTENABLE MATERIALS

Games Slayter and Henry J. Snow, Newark, and Robert G. Russell, Granville, Ohio, and Dale Kleist, Sur Lausanne, Switzerland, assignors to Owens-Corning Fiberglas Corporation, a corporation of Delaware Original application Apr. 18, 1956, Ser. No. 578,926, now Patent No. 3,026,563, dated Mar. 27, 1962. Divided and this application Aug. 7, 1961, Ser. No. 129,872
3 Claims. (Cl. 65—15)

This invention relates to method and apparatus for processing heat-softenable materials in the production of fibers or discrete bodies from heat-softenable materials and pertains more especially to forming fibers, filaments, films, flakes or particulate forms and to a method and apparatus for coating certain of the bodies with metal or metallic substance. This application is a division of our copending application Serial No. 578,926, now Patent No. 3,026,563.

It has been commercial practice to form molten glass, slag, or fusible rock into fibers by subjecting streams of the molten materials to high velocity gaseous blasts which are effective to draw out or attenuate the streams to fibers or discrete bodies. Blasts at temperatures below the fusing point of the materials such as steam and air blasts have been used for the purpose, and finer fibers or discrete bodies have been formed by engaging the molten materials by high velocity gaseous blasts wherein the gases are at temperatures above the fusing temperatures of the materials.

Developments have been made and used wherein a stream of glass or other heat-softened attenuable mineral material is delivered into engagement with a rotating spinner or rotor and is acted upon by centrifugal forces through rotation of the spinner or rotor to project the heat-softened material outwardly of the axis of rotation whereby the material is formed into elongated bodies. Where it is desired to form fine fibers from the bodies, a gaseous blast is employed to draw out or attenuate the bodies to fibers.

In arrangements of this character, a glass stream or streams of molten material are introduced into the hollow spinner or rotor and engage a surface within the spinner or rotor and is moved outwardly by centrifugal forces into engagement with a perforated wall of the spinner. The effective distribution of the material within the rotor has presented difficulties in order to secure a uniform amount of molten material at the peripheral wall of the rotor in order to secure satisfactory formation of bodies projected from the spinner.

The present invention embraces a method and means of distributing softened material by rotating means in order to obtain desired placement of the material relative to the axis of rotation to produce discrete bodies of the material having substantially uniform characteristics.

An object of the invention resides in a method of distributing molten mineral material by centrifugal forces to form elongated bodies of the molten material, the method being adaptable for producing elongated bodies of various sizes and shapes in cross-sectional configurations.

Another object of the invention embraces structural arrangements for delivering molten mineral material generally outwardly of an axis to effect a uniform distribution at a zone or zones spaced from the axis at which the material may be formed by centrifugal forces into elongated bodies or filaments of predetermined cross-sectional configuration.

Another object of the invention resides in the provision of a rotatable component especially adapted for transferring molten material moving in a generally vertical path to a plurality of outwardly directed paths of traverse, the arrangement embodying means for subdividing or separating the outwardly moving material into discrete bodies for further processing.

Another object of the invention resides in the provision of rotatable means for distributing heat-softened mineral materials wherein the material is projected through apertures of predetermined configuration or shape for forming discrete bodies of the projected material.

Another object of the invention resides in the provision of means associated with a rotor arranged to receive one or more streams of heat-softened mineral material and transfer it in outwardly directed paths under the influence of centrifugal forces for obtaining desired circumferential distribution of the material.

Another object of the invention resides in a method of distributing molten mineral material by centrifugal forces involving the utilization of a partitioned or compartmented rotor adapted to receive molten material from a central zone, the material being delivered into the compartments and discharged therefrom in the form of discrete bodies such as filaments, fibers, ribbon, film or flake-like products, or other forms for further processing.

Another object of the invention embraces a method and apparatus for concomitantly forming heat-softened glass or other vitreous material into elongated formation and coating the formation with metal or metallic material while the glass or vitreous material is in a nascent state whereby a tenacious bond is established between the glass or vitreous material and the coating material.

Another object is the provision of means for distributing flowable material by centrifugal forces to a circular zone spaced from an axis of rotation whereby the distribution or collection of the material at the circular zone may be regulated and controlled.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 6 is a vertical sectional view showing a form of material distributing means or rotor construction of the invention;

FIGURE 7 is a horizontal sectional view taken substantially on the line 7—7 of FIGURE 6;

FIGURE 14 is a fragmentary isometric view of a portion of a rotor embodying chambers arranged to assist in attaining uniform peripheral or circumferential distribution of material;

FIGURE 15 is a horizontal sectional view through the rotor shown in FIGURE 14 illustrating the arrangement of material distribution control means in the rotor;

FIGURE 16 is a top plan view of a rotor formed with circumferentially spaced material distributing arms or chambers;

FIGURE 17 is a horizontal sectional view taken substantially on the line 17—17 of FIGURE 16;

FIGURE 18 is an end view of one of the arms of the rotor construction shown in FIGURES 16 and 17 illustrating a shape of orifice for producing a thin ribbon or film of the material projected from the rotor;

FIGURE 19 is illustrative of a modified form of material discharge portion of the rotor of FIGURES 16 and 17 for producing elongated bodies or filaments of circular cross-section;

FIGURE 20 is a vertical sectional view through a multiple armed or chambered rotor especially adapted for forming film glass;

FIGURE 21 is an end view of one of the arms of the rotor shown in FIGURE 20;

FIGURE 22 is a sectional view illustrating a multiple armed rotor for coating or applying a thin body of glass with metallic material as the body is formed;

FIGURE 23 is a horizontal sectional view illustrating an arrangement embodied in the rotor construction of FIGURE 22 for directing the metallic coating into contiguous contact with the glass body being formed;

FIGURE 24 is a transverse sectional view taken substantially on the line 24—24 of FIGURE 23;

FIGURE 25 is a view similar to 23 illustrating an arrangement for coating both major faces of a ribbon or film of glass, and FIGURE 26 is a transverse sectional view taken substantially on the line 26—26 of FIGURE 25.

The method and apparatus of the invention are illustrated as particularly usable for forming fibers, filaments, ribbons, films or other elongated bodies of various configurations and cross-sectional shapes from heat-softenable materials, such as glass, fusible rock, slag, or fiber-forming resins, through the utilization of centrifugal forces. It is to be understood that the method and apparatus of the invention, while having particular utility in forming bodies of the character and shapes above mentioned, may be used for other kindred or similar purposes.

Figure 1:
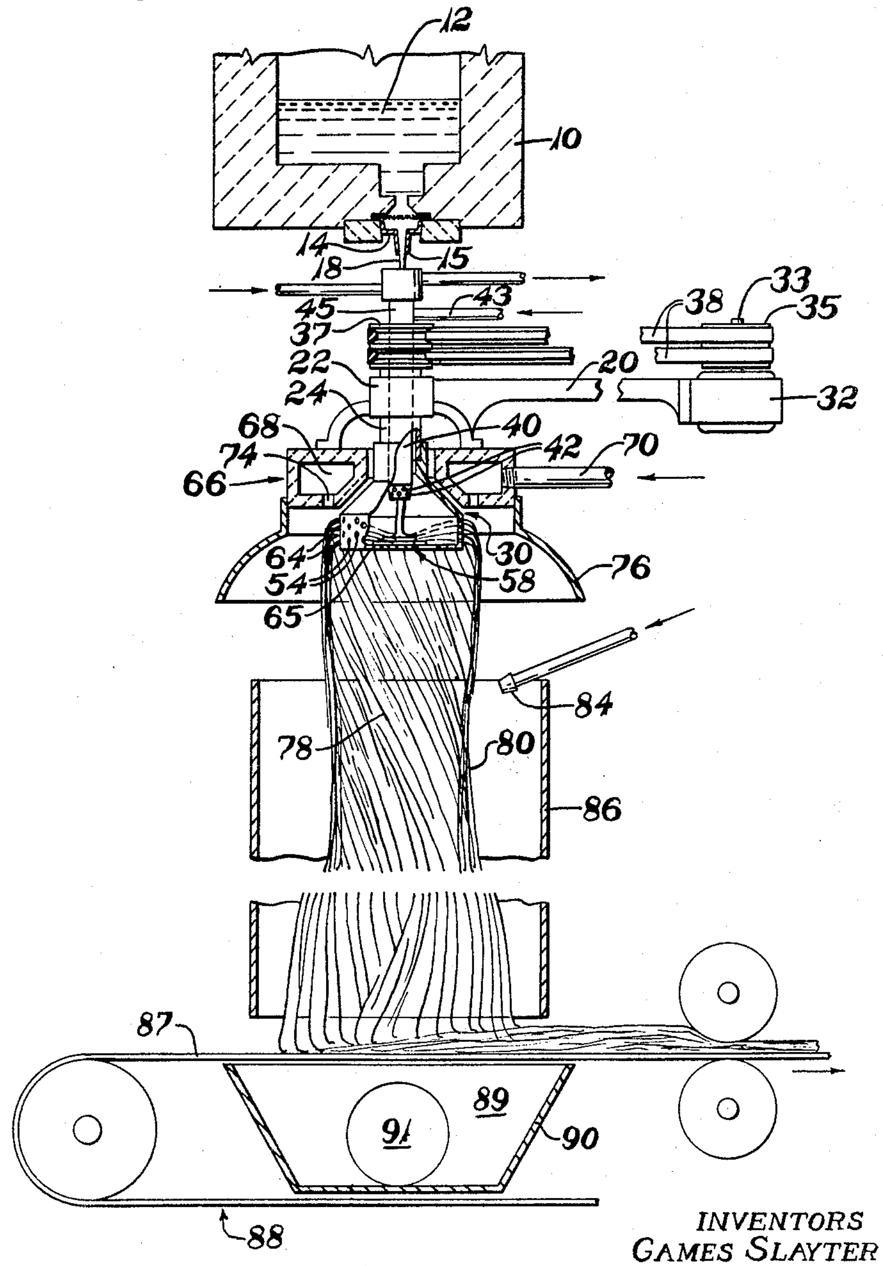
FIGURE 1 is a semidiagrammatic vertical sectional view of apparatus for carrying on the method of the invention.
Figure 2:
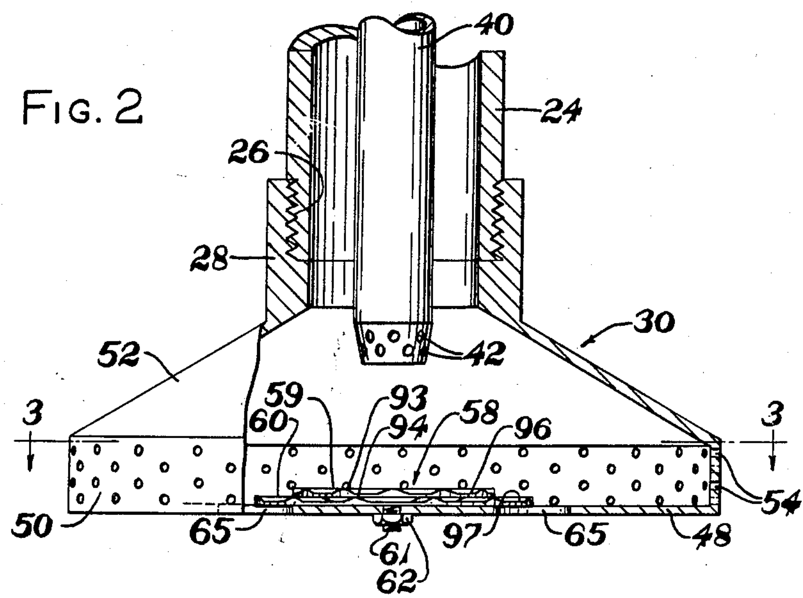
FIGURE 2 is an enlarged vertical sectional view of the form of fiber-forming material distributing apparatus shown in FIGURE 1.
Figure 3:
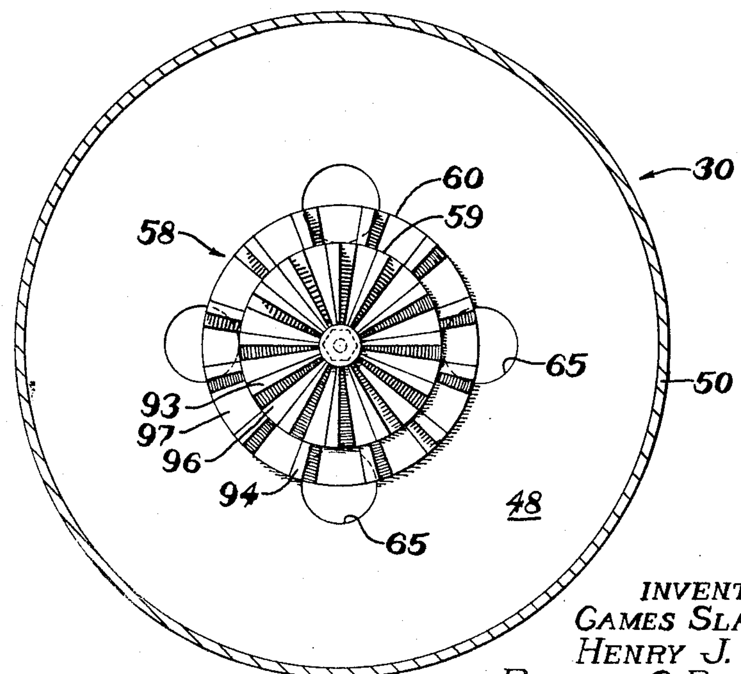
FIGURE 3 is a horizontal sectional view taken substantially on the line 3—3 of FIGURE 2.

Referring to the drawings in detail and first to the apparatus shown in FIGURE 1 which incorporates the component elements illustrated in FIGURES 2 and 3, a forehearth 10 is connected with a melting furnace (not shown) in which glass batch or other heat-softenable fiber-forming material 12 is reduced to a flowable or molten condition providing a supply in the forehearth 10. Secured to the bottom wall of the forehearth 10 is a feeder or bushing 14 formed with an orifice or outlet 15.

The molten material 12 in the forehearth flows through the feeder 14 and through the outlet 15 providing a stream 18 of glass or other material in the forehearth. Positioned adjacent and beneath the forehearth 10 is a frame or frame structure 20 which is formed or associated with a hollow boss portion 22, the latter being arranged to enclose suitable bearings (not shown) upon which is journally supported a shaft or spindle 24 disposed for rotation about a substantially vertical axis.

As particularly shown in FIGURE 2, the lower zone of the shaft or spindle 24 is threaded as at 26 or especially shaped to receive and support a hub portion 28 of a rotatable hollow member, rotor, or spinner 30 which is arranged to rotate with the spindle or shaft 24. It is to be understood that the rotor may be carried by other means adapted to be driven by the shaft in a manner to establish an effective drive for the rotor.

The means illustrated for rotating the rotor is inclusive of a motor 32, supported on the frame 20, the shaft 33 of the motor being equipped with a pulley 35. The shaft or spindle 24 above the hub portion 22 is equipped with a pulley 37, and driving belts 38 connect the pulleys 35 and 37 so as to establish a drive between the motor 32 and the shaft 24 for rotating the shaft and the rotor 30.

The spindle 24 is hollow or tubular and accommodates a cylindrically shaped starting burner 40, the latter being formed with nozzles or outlets 42 in the portion extending into the rotor through which burning gases or intensely hot burned gases are projected for heating up the rotor and for maintaining the material in the rotor in a flowable or mobile condition. A combustible mixture may be introduced into the burner 40 by means of a tube 43.

A cooling jacket 45 is disposed adjacent and within the spindle 24 in order to convey away excessive heat from the molten material so that the spindle may be maintained at safe operating temperatures. The burner 40 is of hollow configuration or has a central passage formed to accommodate the movement of the glass stream 18 into the interior of the rotor 30.

As particularly shown in FIGURE 2, the hollow rotor or spinner 30 is formed with a bottom wall 48, a circularly shaped peripheral wall 50 and a frusto-conically shaped wall 52 joining the circular peripheral wall with the central hub portion 28.

The peripheral or circumferential zone or wall 50 as shown in FIGURES 1 and 2 is formed with a large number of comparatively small apertures or orifices 54 through which molten or heat-softened material within the rotor 30 is discharged or projected by centrifugal forces of rotation to form discrete elongated bodies or primary filaments 64 of the material.

The arrangement shown in FIGURES 1 through 3 is inclusive of a material distributing means 58 preferably disposed centrally of the rotor 30 and arranged in the path of and to be impinged by the stream 18 of heat-softened material. As particularly shown in FIGURES 2 and 3, the distributing member 58 at the central zone of the rotor is formed with two concentrically arranged zones 59 and 60. The zone 59, as shown in FIGURE 3, is of circular shape and the zone 60 is of annular shape and surrounds the zone 59, the average level of the zone 59 being above the average level of the annular zone 60 as illustrated in FIGURE 2.

The member or construction 58 is provided with a threaded tenon 61 which is secured to the bottom wall 48 of the rotor by means of a nut 62. It is to be understood that the member 58 may be secured to the rotor by other suitable means.

With particular reference to FIGURES 2 and 3, it will be noted that the zones 59 and 60 of the distribution means 58 are formed respectively with radially extending circumferentially spaced raised portions or lands 93 and 94 which provide depressions or recesses 96 and 97 existent between adjacent pairs of raised portions or lands.

The stream of heat-softened glass or other fiber-forming material impinges upon the central zone of the material distributor 58, the flowable material being dispersed along the radial recesses 96 and 97 under the influence of centrifugal forces due to rotation of the distributing means 58 with the rotor 30. The raised lands or ribs 93 and 94 tend to direct or influence the movement of molten material in radial directions along the troughs or recesses 96 and 97.

In this manner the molten glass or fiber-forming material is distributed more uniformly about the circumferential or circular peripheral zone or wall 50 of the rotor 30. By this method of distribution of material by the distribution means 58, a more uniform film or quantity of molten glass is maintained throughout the entire periphery of the wall 50 so that the orifices 54 in the rotor wall are continuously supplied with the fiber-forming material.

The bottom wall 48 of the rotatable element, rotor or spinner 30, is preferably formed with circular openings 65 which are partially covered by the annular portion 60 of the material distributing member as illustrated in FIGURE 3. The openings 65 provide venting means to facilitate the escape of gases from the interior of the rotor so that the gases do not impair or interfere with the distribution or projection of the material through the orifices 54.

The material impinging upon the zones 59 and 60 of the material distribution means is moved outwardly by centrifugal forces of rotation and is extruded through the orifices 54 in the rotor wall or peripheral zone 50 as discrete bodies or primary filaments 64. In the embodiment of the invention shown in FIGURE 1, the discrete bodies or primary filaments 64 are attenuated to fine fibers by engaging the bodies or filaments with attenuating forces such as high velocity gaseous blasts.

In order to produce fine fibers, it is desirable to utilize an attenuating blast of intensely hot gases at temperatures above the attenuating temperature of the glass moving at high velocities. The arrangement shown in FIGURE 1 includes a burner 66 of annular configuration surrounding the upper portion of the rotor 30 and formed with an annular combustion chamber or confined zone 68 into which combustible mixture is introduced through one or more tubes 70 and the mixture burned under confined conditions.

The combustion zone 68 may be a continuous annularly shaped chamber or the same may be subdivided by radially arranged baffles or walls (not shown). When a multi-chamber burner construction is employed, combustible mixture is delivered to each of the individual chambers. The combustion zone or chamber is lined with high temperature refractory to withstand the intense heat of the burning gases.

The lower wall of the burner 66 is formed with an annularly shaped restricted orifice 74 through which the intensely hot burned gases or products of combustion from the combustion zone 68 are extruded or projected as an intensely hot high velocity annular blast. The annular orifice construction 74 is disposed so that the gases of the blast move downwardly in substantially concentric relation to the peripheral zone or wall 50 of the rotor 30, the bodies or primary filaments of softened material being projected endwise from the openings in the rotor wall into the attenuating blast and attenuated thereby into fine fibers 78. A hood or skirt 76 may depend from the burner 66 for the purpose of reducing the air stream induced by the high velocity gases as well as to reflect or concentrate the heat of the blast adjacent the fiber attenuating zone. The fibers 78 move downwardly entrained in the gaseous blast in the general form of a hollow column or beam 80.

An adhesive, bonding agent or other fiber coating material may be delivered onto the nascent fibers by means of an applicator or spraying device 84 preferably centrally disposed interiorly of the beam 80 of fibers.

The beam of fibers may be confined within or pass downwardly through a hood or shield 86 and may be collected upon the upper flight of an endless belt conveyor 88. The conveyor 88 may be of foraminous type and a chamber 89 formed by a receptacle 90 is disposed adjacent the fiber collection zone of the conveyor flight 87. Suction or reduced pressure may be established in the chamber 89 through a duct 91 connected with a suction blower, the suction assisting in collecting the fibers in a mass or mat formation upon the conveyor as well as conveying away spent gases of the attenuating blast.

Figure 4:
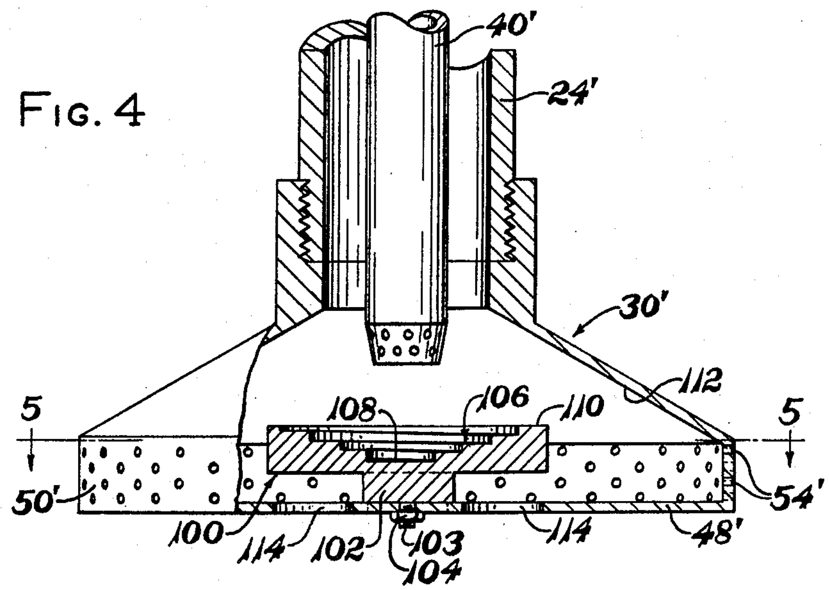
FIGURE 4 is a vertical sectional view similar to FIGURE 2 showing another form of material distributing means of the invention.
Figure 5:
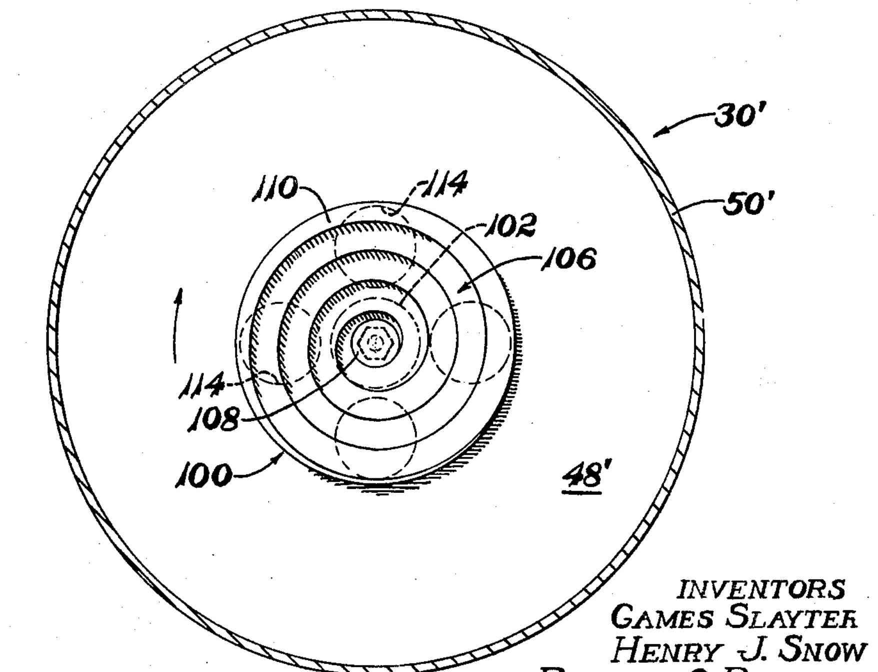
FIGURE 5 is a horizontal sectional view taken substantially on the line 5—5 of FIGURE 4.

FIGURES 4 and 5 illustrate another form of material distributing means for use with a rotor. In this form the bottom wall 48' of the rotor 30' supports a material distributing member 100 of generally circular shape and is formed with a centrally disposed hub or boss 102 provided with a threaded tenon 103 extending through a central opening formed in the rotor wall 48' and is secured in place by means of a nut 104.

The circular wall 50' of the rotor construction is formed with a plurality of small orifices 54' through which material on the interior of the rotor is distributed by centrifugal forces to form discrete linear bodies or primary filaments in the same manner as the rotor shown in FIGURES 1 and 2. The material distributing member 100 is formed with an involute-like spiral path or surface 106, and the successive turns or convolutions of the spiral 106 are progressively elevated as shown in FIGURE 4.

The molten glass or other fiber-forming material flows downwardly adjacent or on the axis of the spindle 24' and rotor 30' through the hollow burner tube 40' and is delivered into or impinges upon the central flat portion 108 of member 100. The portion 108 is the starting zone of the spirally shaped path or surface 106. The molten glass is moved outwardly and upwardly under the influence of centrifugal forces traversing the curved spiral path 106 until the molten material reaches the perimeter or outermost region 110 of the spiral configuration. The material moves over and outwardly of the perimeter or region 110 under the influence of centrifugal forces.

The material moving outwardly of the region or perimeter 110 impinges upon the angularly disposed or conically shaped wall 112 and flows outwardly and downwardly onto the inner surface of wall 50' and is dispersed along the said wall surface to provide an adequate supply of material adjacent the orifices 54'. The material, traversing the spiral incline 106, is further refined and rendered more homogeneous by reason of the added distance of travel of the material in a spiral path.

Furthermore, with this form of construction the rotor may be rotated at a lower speed and a more inexpensive glass composition may be used to produce the fibers by reason of the added refining step of the method. Another advantage of rotating the rotor at a slower speed is that erosion or attrition of the walls of the orifices in the rotor periphery is substantially reduced.

Reduction in rotor speed also makes possible the use of platinum alloys for the rotor construction as such alloys have a much greater resistance to wear under the action of flowing glass than alloy steels or similar metals usually used for rotor constructions. The bottom wall 48' of the rotor is provided with the vent openings 114 to provide for escape of hot gasses from the interior of the rotor.

It is to be understood that the spirally arranged surface 106 of the material distributing arrangement may be varied in width and degree of inclination or pitch to modify or change the length of travel of the material before it is projected from the distributor. By this method a degree of control may be exercised over the refining and homogenization of the material.

The glass or other molten material projected outwardly from the distributor 100 engages the conically shaped surface 112 and flows onto and is collected at the peripheral wall 50 from which it is projected by centrifugal forces through the openings 54' to form discrete bodies or primary filaments. It is to be understood that the rotor and distributor arrangement of FIGURES 4 and 5 may be utilized with a blast producing means of the character shown in FIGURE 1 for directing a gaseous blast into engagement with the projected bodies or primaries and attenuating the same to fibers.

FIGURES 6 and 7 illustrate a modified form of means for distributing molten material outwardly of an axis of rotation and for separating or subdividing the material into discrete bodies or filaments. The rotor 118 is formed with a hub structure 28'' which is threadedly connected or otherwise joined to a spindle or rotatable member 24'', the latter being rotated by a motor (not shown) in the manner illustrated in FIGURE 1.

The rotor 118 is formed with a bottom wall 120 which is preferably slightly convex in character, the bottom wall being joined to a frusto-conically shaped upper wall 122 by a second frusto-conically shaped peripheral wall 124. The angularity of the peripheral wall 124 is upwardly and outwardly of the bottom wall. The angularity or taper of the peripheral wall 124 may be varied in order to secure the most efficient delivery of discrete bodies or primary filaments of the material projected from the orifices 126.

The rotor 118 is equipped or provided with a material distributing member 130. The glass stream may be delivered onto the distributing member 130 through the hollow interior of the burner tube 40″ as in the form of the invention shown in FIGURE 1. The burner tube 40″ may be equipped with a tubular extension 132 so as to confine the stream of glass or molten material in a non-rotating tubular construction provided by the burner tube 40″ and the tubular extension 132.

When the extension 132 is employed as shown, the burner may not be used. The burner tube 40″ may be made longer and in such arrangement the extension sleeve 132 may be dispensed with.

In the use of either arrangement, swirling of the glass is avoided prior to its impingement or engagement with the distributing member 130.

The distributing member 130 shown in FIGURES 6 and 7 is generally similar to the distributor shown at 58 in FIGURES 2 and 3. The distributor 130 is formed with two vertically spaced concentric surfaces 135 and 136, the surface 135 being formed with circumferentially spaced radially extending ridges or lands 137 forming recesses 138. The surface zone 136 is formed with circumferentially spaced radially extending ridges or lands 140 providing recesses or depressions 142.

The member 130 is provided with a tenon 144 adapted to project through an opening in the bottom wall 120 of the rotor and receives a securing nut 146 or other means for fixedly securing the distributor to the rotor. The stream of glass or other molten mineral material is delivered through the relatively stationary tubular extension 132 or through an extended burner tube 40″ into impinging engagement with the central zone of the distributor 130. As the distributor rotates with the rotor, centrifugal forces act upon the flowable or molten material to project the same along the recesses 138 and 142 thence outwardly of the member 130.

The material, moving outwardly from the axis of rotation of the distributor 130 engages the inner frusto-conical surface 125 of the peripheral wall 124 and, due to the upwardly and outwardly flaring shape of the wall surface, the material, under the influence of centrifugal forces, moves upwardly along the surface 125. Through this arrangement an adequate amount of molten glass or other mineral material is maintained adjacent the outlets or orifices 126 through which the material is projected to form discrete bodies or primary filaments.

Figure 9:
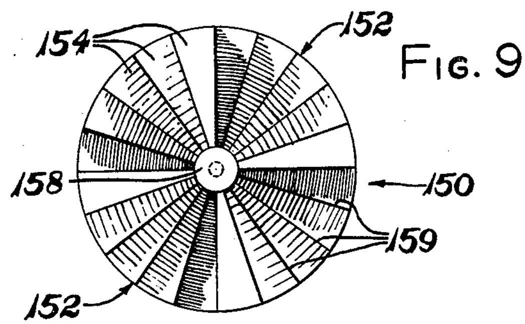
FIGURE 9 is a top plan view of the arrangement shown in FIGURE 8.
Figure 8:
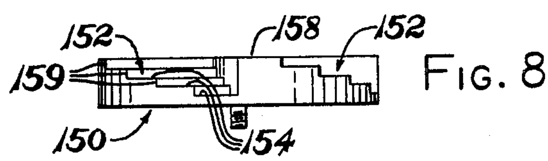
FIGURE 8 is an elevational view illustrating another form of material distributing means.

FIGURES 8 and 9 illustrate another form of material distributing means for use with a rotor construction. The distributing member 150 is preferably of circular shape and has its upper surface subdivided into radially extending zones 152, there being four major zones shown in the drawings, each major zone being formed or arranged with a plurality of surfaces for distributing the material at different levels. As particularly shown in FIGURE 8, each major material distributing zone occupies substantially a quarter sector of the member 150.

Each zone 152 is formed with several surface areas 154 of sector shape, the surfaces of a zone being arranged at progressively increased heights or different levels as shown in FIGURE 8. The distributing member 150 is disposed within a rotor so that the central region 158 thereof is engaged or impinged by a stream of molten glass or other material delivered into the rotor. The material moves outwardly onto the surface areas 154 of the distributing zones 152.

As the member 150 is rotating with the rotor, the material on the surface zones 154 is moved circumferentially by the vertical walls 159 joining the surfaces 154 and outwardly under the influence of centrifugal forces of rotation. By disposing the surfaces 154 of the distributing zones 152 at various levels preferably in a circumferential echelon relation as illustrated, the material is further refined as it moves along the surfaces 154 and is distributed at the various levels in the planes of the surfaces 154.

Through the medium of member 150, the molten material is substantially uniformly distributed over the perforated circular wall or peripheral zone of a rotor with which the member 150 may be associated. It is to be understood that rotors of the character shown herein may be utilized with the distributing member shown in FIGURES 8 and 9 or with any of the material distributing means disclosed herein.

Figure 11:
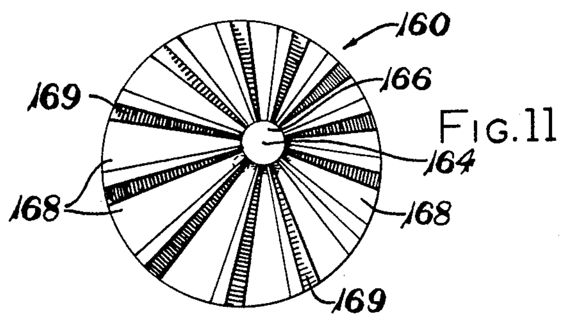
FIGURE 11 is a plan view of the arrangement shown in FIGURE 10.
Figure 10:
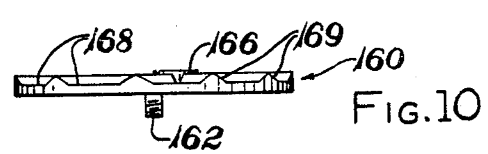
FIGURE 10 is an elevational view illustrating another form of material distributing means.

FIGURES 10 and 11 illustrate a distributing member of circular shape with a series of circumferentially arranged material distributing zones in the form of radially extending depressions and ridges or lands convergently arranged about an axis spaced from or eccentric to the axis of rotation of the distributing member. The member 160 which is of disk-like shape is formed with a threaded tenon 162 projecting from its bottom wall providing means for securing the member 160 to a rotor.

The axis of rotation of the distributing member is about the axis of the tenon 162 which is disposed at the geometric center of the circular member 160. Arranged about a center 164 offset from the center of the disk is a surface 166 preferably of circular shape as shown in FIGURE 11. Extending radially from the surface 166 and in converging relation with respect to the center 164 is a series of radially extending circumferentially spaced zones or recesses 168 which are formed by similarly spaced upwardly extending lands or ridges 169.

In this form of construction, the member 168 is associated with the central zone of a rotor and preferably mounted so that the geometric center of member 160 at the axis of the tenon 162 is coincident with the center of rotation of the rotor and in the path of the stream of glass or other molten material. Thus the glass stream is impinged upon the geometric center or center of rotation of the distributing member 160 and directly upon the radially extending alternately arranged depressions 168 and ridges 169.

The force of the glass under the influence of gravity impinging upon the V-shaped ridges and depressions adjacent the ridges and the influence of centrifugal forces causes the glass to be dispersed outwardly.

The ridges 169 form paddle-like projections on the upper surface of the slinger to effect a flipping or splashing of the glass or molten material toward the orifice wall or peripheral zone of the rotor with which the member is used.

Figure 12:
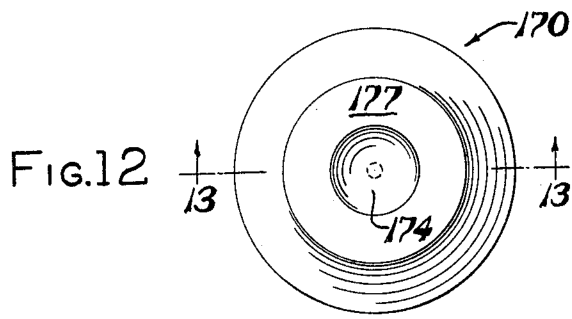
FIGURE 12 is a plan view of another form of material distributing means.
Figure 13:
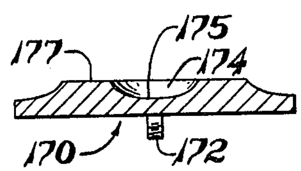
FIGURE 13 is a sectional view taken substantially on the line 13—13 of FIGURE 12.

FIGURES 12 and 13 illustrate another form of material distributing means adapted to be associated with rotor constructions of the character disclosed in the drawings. The distributing member 170 is formed with a threaded tenon portion 172 projecting from its bottom wall for securing the member to a rotor construction. The upper zone or surface of member 170 is formed with a recess, cavity or depression 174 defined by a curved line 175 generating a surface by rotation of the line about a central axis through the tenon 172.

As illustrated in FIGURE 13, the surface defining the depression is of compound curvature but it is to be understood that the depression of cavity 174 may be defined by other shapes of curved wall and may be in the shape of a spherical segment. The member 170 is adapted to be positioned within a rotor whereby a glass stream is delivered into the recess or depression 174.

The member 170 is arranged to rotate with the rotor and the molten glass or other flowable material impinging on the concave surface defining the recess is deflected and dispersed outwardly and upwardly, not only by the reaction of the material striking the bottom wall of the recess but also by reason of the centrifugal forces of rotation. Some of the material moves upwardly and in flight above the annular surface 177 surrounding or forming the rim of the depression 174 and some of the glass may flow radially from the center of rotation of the member 170 along the planar surface 177 and outwardly by centrifugal forces into engagement with a material distributing perforated wall of a rotor.

It is to be understood that the direction of dispersion of the material outwardly of the recess 174 may be controlled by the shape of the curved surface zone defining the contour of the cavity or depression. The means shown in FIGURES 12 and 13 attains a substantially uniform peripheral distribution of the molten material.

FIGURES 14 and 15 illustrate a form of rotor construction 245 for forming or producing discrete bodies, primaries or linear formations of heat softenable materials such as glass, slag or fusible rock. The rotor construction shown in FIGURES 14 and 15, may be used with or embodied in the burner arrangement shown in FIGURE 1 wherein a high velocity blast of gases is utilized to attenuate discrete bodies, primary filaments or linear formations of the material to fine fibers.

The rotor construction 245 is formed with a hub portion 247 adapted to be secured to a rotating shaft 24 of the character illustrated in FIGURE 1. The rotor is formed with a circular, vertically-disposed peripheral wall 249 and an inwardly extending bottom wall portion 250, the latter defining an opening 252 through which gases may escape.

The wall 249 is formed with a large number of outlets or orifices 254 through which material on the interior of the rotor is delivered outwardly by centrifugal forces of rotation as discrete bodies, primary filaments or linear formations of material. The rotor is adapted to be rotated by suitable means as, for example, the motor and driving means of the character illustrated in FIGURE 1. Disposed interiorly of the rotor between the bottom wall 250 and the upper converging wall 248 of the rotor are radially spaced partitions, baffles or walls 256 forming circumferentially disposed chambers 258.

The molten material such as glass is introduced into the interior of the rotor through the hollow shaft 24 in the form of a stream 260. Disposed within the shaft 24 and fixedly supported against rotation is a tube or pipe 262 having a nozzle construction 264 disposed to direct a stream of gas under pressure, such as compressed air, in a direction normal to the axis of the rotor so as to impinge upon the material of the stream 260 and project the material radially into the chambers 258 during rotation of the rotor 245.

Through this arrangement, the molten material to be projected through the orifices 254 is substantially uniformly apportioned to the chambers 258 so that each peripheral zone adjacent the wall 249 in each chamber receives substantially the same amount of material. The baffles or walls 256 also serve to reinforce the rotor construction to effectively resist deformation or distortion by reason of high speed rotation of the rotor.

The discrete bodies, primary filaments or linear formations of the heat softened material projected through the orifices 254 may be engaged by an intensely hot, high velocity gaseous blast in the manner illustrated in FIGURE 1 whereby fine fibers are formed or attenuated from the discrete bodies or primary filaments.

FIGURES 16 and 17 illustrate a modified form of rotor construction provided with a plurality of tubular extensions or arms through which material is delivered and distributed under the influence of centrifugal forces. The rotor 270, which is of hollow configuration is formed with a hub portion 272 adapted to be secured to a hollow shaft 24. The rotor 270 is formed with projecting arms or extended portions 274 which are of hollow or tubular configuration as shown in FIGURE 17.

While the rotor of FIGURES 16 and 17 is illustrated as formed with four arms in the form of a Maltese cross, it is to be understood that the rotor may be formed with any number of arms or hollow projecting portions so long as dynamic balance is maintained about the central axis of the rotor. The shaft 24 and the rotor 270 may be rotated in the manner illustrated in FIGURE 1 or by other suitable means.

Disposed centrally of a lower wall 276 of the rotor is a material distributing member 278, the upper surface of which is impinged by the stream 279 of glass or other molten material delivered into the rotor through the hollow shaft 24. The material distributing member 278 may be formed with a substantially flat surface as illustrated.

The member 278 may be of other configuration effective to distribute the material substantially equally through the rotor arms 274. Each of the arms 274 is provided with an end wall 280. Each of the end walls 280 is provided with orifice means through which the material within the arms 274 is projected under the influence of centrifugal forces of rotation.

FIGURE 18 is illustrative of an end wall of an arm 274 of the rotor 270 provided with a vertically disposed thin narrow slot or opening 282. The slot 282 provides for the extrusion or projection of a thin film or ribbon-like body of glass or other molten material. The film may be so thin that the same may be readily broken up into flakes usually referred to as flake glass.

FIGURE 19 is an end view of a rotor arm illustrating the end wall provided with a plurality of orifices or outlets through which the molten material within the rotor may be projected in the form of a plurality of discrete bodies or filaments. The end wall 280′ as shown in FIGURE 19 is provided with a substantial number of circularly shaped outlets 284, the size of the outlets 284 being dependent upon the character of body to be formed.

For example, if coarse primary filaments are to be formed, the outlets 284 may be of substantial diameter. If fine filaments or fibers are desired, the outlets 284 may be made very small. The bodies of material are attenuated to a certain extent by reason of the high curvilinear speed of the end walls 280 and 280′ moving about the axis of rotation of the rotor during extrusion or delivery of the material through the slots or orifices.

FIGURES 20 and 21 illustrate another form of rotor construction, especially adapted to form glass or other heat-softenable material into thin films for forming flakes of glass or the like. The rotor 290 is formed with a hub portion 292 which is secured and supported by a hollow shaft or tubular member 24a which is journaled in suitable bearings (not shown). The shaft 24a is provided at its upper extremity with a sheave or pulley 37a driven by a motor (not shown) by means by driving belts 38a.

The rotor is formed with a tapering or frusto-conically shaped wall zone 294 and a bottom wall 295. The rotor is also formed with circumferentially spaced wall zones 296. While four zones of this character have been illustrated, it is to be understood that any number of zones 296 may be formed at the periphery of the rotor within the dimensional limitations thereof. Each of the zones 296 is formed with a circular row of small outlets or orifices 298 as shown in FIGURE 21 which are disposed as close together as possible. Each of the zones 296 is formed with a circular cylindrically shaped hood or shroud 300 which circumscribes or surrounds the circular group of outlets or orifices 298. Molten material within the rotor is discharged through the groups of openings or orifices 298 and, due to the close positioning of the orifices in the circular row, a substantially circular cylindrical thin walled body or tubular formation of glass or other molten material is formed within the confined zone provided by the shrouds or hoods 300. A stream 302 of glass or other molten material is delivered from an outlet 304 formed in a forehearth 306 containing a supply of molten glass or other film-forming material.

The arrangement shown in FIGURES 20 and 21 includes means for delivering a fluid, such as compressed air or other gas under pressure, to the film forming zones 296 of the rotor construction. Disposed axially of the hollow shaft or tubular member **24*a* and the rotor 290 is a manifold tube or pipe 310 formed at its lower extremity with a fitting 312 having a plurality of branch pipes 314, each branch pipe 314 being connected with a rotor wall portion at the zone 296. The outlet 316 of each of the tubes 314 is centrally arranged with respect to the circular row of orifices 298 at each of the zones 296**.

A material distributing member 318 may be secured to the pipe 310 or formed as an integral part of the fitting 312. The pipe 310, fitting 312, branch pipes 314 and the material distributing member 318 rotate with the rotor 290. A pipe 320, connected with a supply of compressed air or other gas under pressure, is relatively stationary and a sealing means 322 of conventional construction joins the rotatable pipe 310 with the stationary pipe 320 forming a fluid tight connection. The bottom wall 295 of the rotor may be formed with openings 324 to provide for the escape of gases that may accumulate within the rotor.

In the operation of the arrangement shown in FIGURES 20 and 21, the shaft **24*a* and rotor 290 are rotated by a motor (not shown). The stream of glass 302 directed through the hollow shaft 24*a* impinges upon or engages the rotating distributing member 318, centrifugal forces acting upon the glass through its engagement with the distributing member 318 projects or delivers the glass or other molten material into contact with the inner surface of the tapered wall portion 294** of the rotor.

The centrifugal forces established by rotation of the rotor act upon the material in contact with the rotor wall 294 whereby the material is distributed over the inner wall surfaces of the zones 296 of the rotor. The glass or other molten material adjacent the zones 296 is projected through the circular rows of orifices 298 concurrently with the delivery of gas under pressure through the tubes 310 and 314 through the outlets 316 into the interior of the substantially cylindrical tubular configuration or film formed of the glass projected through the openings 298 and confined by the hoods or enclosures 300.

The cylindrical or tubular films of glass formed within the hoods or shrouds 300 are moved outwardly by centrifugal forces of rotation of the rotor and, influenced by the expansion of the compressed air or other gas under pressure delivered into the interior of each of the cylindrical films, the films are blown up and attenuated to very thin formation. Upon chilling, the thin films are broken up to form flakes of glass. Through this method and arrangement, flake glass may be produced inexpensively and in large quantities.

FIGURES 22 through 24 illustrate a form of rotor construction especially adapted for coating or laminating thin films of glass or other mineral material with a very thin layer of metal or metallic alloys. The rotor construction may be of the tubular multi-armed type similar to that shown in FIGURE 16.

The rotor 330 is formed with a hub portion 332 which is secured to the lower extremity of a hollow shaft **24*b* or other rotatable support adapted to be driven in the same manner as the shaft 24 in the arrangement shown in FIGURE 1. The rotor 330 is formed with four arms 334** in the embodiment illustrated, but it is to be understood that any number of arms may be employed if desired.

Disposed interiorly of the shaft **24*b* and preferably forming a part of the rotor 330 is a sleeve 336 formed at its lower end with an outwardly extending flange portion 338 which is welded or otherwise joined to the wall of the rotor beneath the hub portion 332. The sleeve 336 forms with the wall of the hollow shaft 24*b* an annular chamber 340** which is adapted to receive and contain molten metal or molten metal alloy for coating films of glass.

Each of the arms 334 of the rotor is formed with an outer wall 342 preferably of rectangular cross section as illustrated in FIGURE 24. Disposed lengthwise of each of the arms 334 is a partition or wall 348 separating each rotor arm into two chambers or passageways 344 and 346. Each of the passageways or chambers 344 is in communication with the central chamber 340 containing molten metal or metallic coating material.

Each of the passageways or chambers 346 in the rotor arms is in communication with the central zone 349 of the rotor. The bottom wall 347 of the rotor construction supports at its central zone a glass distributing member 350 disposed in the path of the stream of glass 354 which impinges upon the member 350.

The upper surface of the member 350 may be shaped to effectively deflect and project the molten glass into the chambers 346 of the rotor arms, the centrifugal forces of rotation of member 350 assisting in delivering the glass into the rotor arms. The bottom wall 347 of the rotor may be provided with openings 352 to facilitate the escape of gases from the interior of the rotor.

The extremities 356 of the side walls 342 of each rotor arm are in juxtaposed relation as illustrated in FIGURE 23 forming an outlet or slot 358 of narrow rectangular shape. The end zone 360 of the wall or partition 348 within each rotor arm extends into the space between the portions 356 of the rotor wall providing two narrow rectangularly shaped passageways which, in effect, form a single outlet 358 in the manner illustrated.

Under the influence of centrifugal forces of rotation, the molten glass in each of the rotor chambers 346 is discharged through the outlet 358 as a thin ribbon-like film of nascent glass. Concomitantly with the formation of the glass into ribbon-like shape, molten metal from the chamber 340 flows through each of the chambers or passageways 344 in the rotor constructions and is delivered through the outlet 358 and deposited upon the ribbon-like film of glass as a thin metallic layer.

As the glass delivered through the outlet 358 is of nascent character, the molten metal readily adheres to the glass with exceptional tenacity whereby a composite film or product consisting of layers of glass and metal or metallic alloy is readily formed through the method and apparatus described.

An alloy which has been found to be very satisfactory for coating the glass film comprises a composition of about 98% lead and the remainder of zinc and cadmium. It is to be understood that other metals or metallic alloys may be employed which have the characteristic of adhering to a nascent glass surface.

FIGURES 25 and 26 illustrate a modified form of the rotor arm construction shown in FIGURES 22 and 23. In this form, the rotor arm 364 is provided with interior walls or partitions 366 and 368. The walls 366 and 368 form with the outer walls of the rotor arm 364 the passageways or chambers 370 and 372. The walls 366 and 368 also define a central chamber 374 in each of the rotor arms. The passageways 370 and 372 are in communication with an annular reservoir formed within the rotor supporting shaft which is of the character shown at 340 in FIGURE 22.

The extremities of the outer walls of each rotor arm and the walls 366 and 368 converge into juxtaposed but spaced relation as shown in FIGURE 25 to form a central outlet 376 with outlets 378 and 380 at each side thereof. The central chamber or passage 374 in each of the rotor arms receives molten glass from the central zone of the rotor in the manner illustrated in FIGURE 22, the glass being delivered or projected through the central outlet 376 as a thin film under the influence of centrifugal forces of rotation of the rotor.

The chambers or passageways 370 and 372 receive molten metal from an annular reservoir or supply of the character shown at 340 in FIGURE 22, the molten metal being moved outwardly through the passages 370 and 372 and is discharged through the narrow slots or orifices 378 and 380 onto both major surfaces of the film of glass delivered through the central narrow slot or orifice 376. The molten metal or alloy adheres to the nascent surfaces of the glass delivered through the orifice 376 forming a tri-laminar construction of a thin film of glass with a coating or layer of metal or metal alloy on each major surface thereof.

Through the above described method and the apparatus disclosed in FIGURES 22 through 26, a layer of molten metal or alloy may be quickly and inexpensively deposited upon and adhere to one or both major surfaces of a film or ribbon of glass whereby metal coated glass may be quickly and inexpensively manufactured in production quantities.

It is apparent that, within the scope of the invention, modifications and different arrangements may be made other than is herein disclosed, and the present disclosure is illustrative merely, the invention comprehending all variations thereof.

We claim:

1. Apparatus for processing heat-softened material including in combination, a rotatable hollow element adapted to receive heat-softened material interiorly thereof from a supply, said element having an outer peripheral wall provided with apertures, a member disposed within and carried by the element and adapted to receive the material from the supply, means for rotating the element and member, said member being formed with a spirally arranged surface centered on the axis of rotation of the element arranged to be traversed by the material as the material moves away from the center of rotation under the influence of centrifugal forces and is impelled outwardly of the member, the apertures in the peripheral wall of the element being disposed with respect to the spirally arranged surface to receive material impelled therefrom, the material adjacent the apertured wall being projected through the apertures under the influence of centrifugal forces.

2. Apparatus for processing heat-softened material including, in combination, a rotatable hollow element adapted to receive a stream of heat-softened material interiorly thereof, said element having an outer peripheral wall provided with apertures, a member disposed within and carried by the element and adapted to receive the stream of material, means for rotating the element and member, said member being formed with a spirally arranged surface centered on the axis of rotation of the element arranged to be traversed by the material as the material moves away from the center of rotation under the influence of centrifugal forces, said spiral surface terminating in an annular region from which the material is impelled by centrifugal forces outwardly of the member, the apertures in the peripheral wall of the element being disposed with respect to the annular region to receive material impelled therefrom, the material adjacent the apertured wall being projected through the apertures under the influence of centrifugal forces.

3. Apparatus for processing heat-softenable material including, in combination, a rotatable hollow rotor adapted to receive a stream of heat-softened material interiorly thereof, said rotor having a peripheral wall provided with openings, means for rotating the rotor at a speed whereby centrifugal forces project the material through the openings, a material distributing member disposed in and rotatable with the rotor and adapted to receive the stream of material, said member being formed with a plurality of circumferentially-arranged major sector-shaped zones, each of said major sector-shaped zones being subdivided into a plurality of radially extending sector-shaped surfaces arranged in echelon relation adapted to distritbute the material outwardly toward the peripheral wall of the rotor under the influence of centrifugal forces along the sector-shaped surfaces at different levels.

References Cited by the Examiner

UNITED STATES PATENTS

| | | | |
|---|---|---|---|
| 888,092 | 5/08 | Kestner | 239—222 X |
| 1,869,296 | 7/32 | Beiler | 239—223 |
| 2,220,275 | 11/40 | Preston | 239—223 |
| 2,624,912 | 1/53 | Heymes et al. | 65—14 X |
| 2,980,954 | 4/61 | Levecque et al. | 65—15 |

MORRIS O. WOLK, *Primary Examiner.*

WILLIAM J. STEPHENSON, DONALL H. SYLVESTER, *Examiners.*